United States Patent
Cox

[19]

[11] Patent Number: 5,966,868
[45] Date of Patent: Oct. 19, 1999

[54] FLOWERPOT AND ASSOCIATED ATTACHMENTS

[76] Inventor: Ronald G. Cox, 10650 Mogadore Ave. NW., Uniontown, Ohio 44685

[21] Appl. No.: 08/639,117

[22] Filed: Apr. 24, 1996

[51] Int. Cl.$^6$ .................................................. A01G 9/02
[52] U.S. Cl. ............................................ 47/66.6; 119/69.5
[58] Field of Search ........................ 47/66.6, 39, 65.5; 119/69.5, 61, 51.5

[56] References Cited

U.S. PATENT DOCUMENTS

| | | | |
|---|---|---|---|
| 327,673 | 10/1885 | Gaillard . | |
| 585,486 | 6/1897 | Snow | 47/66.6 |
| 1,419,152 | 6/1922 | Lansing et al. | 47/66.6 |
| 1,895,702 | 1/1933 | Burley . | |
| 2,002,378 | 5/1935 | Richardson | 119/1 |
| 3,084,666 | 4/1963 | Plaisance | 119/1 |
| 3,648,659 | 3/1972 | Jones | 119/1 |
| 4,481,733 | 11/1984 | Jacobs | 47/66.6 |
| 4,821,454 | 4/1989 | Wilds | 47/41 |
| 5,577,344 | 11/1996 | Zaremba et al. | 47/39 |

FOREIGN PATENT DOCUMENTS

| | | | |
|---|---|---|---|
| 2556-927 | 6/1985 | France . | |
| 2614-918 | 11/1988 | France . | |
| 2707835-A1 | 1/1995 | France . | |
| 3931560 | 4/1991 | Germany | 47/66.6 |
| 60-126-197 | 7/1985 | Japan . | |
| 346390 | 6/1960 | Switzerland | 119/69.5 |

*Primary Examiner*—Michael J. Carone
*Assistant Examiner*—Joanne C. Downs
*Attorney, Agent, or Firm*—Renner, Kenner, Greive, Bobak, Taylor & Weber

[57] ABSTRACT

A flowerpot (22) for supporting and carrying a variety of detachable lawn fixtures includes a bottom (44) that has an outer wall (55), an inner wall (54) and a channel (56) defined therebetween. The channel (56) receives dirt, rocks, flowers and the like. Extending from the inner wall (54) is a shoulder (57) and a support wall (58) that is adaptable for receiving a center column (24), an attachment collar (200) or a variety of other attachments. The center column (24) includes a bottom end (66) and a top end (68) which has an opening (70). Extending from the center column (24) is a column shoulder (76) and a support wall (78) that may carry a variety of detachable column fixtures. The variety of detachable column fixtures includes, but is not limited to, a birdbath (26), a fountain (140), an urn (172), an attachment collar (202) to carry a pole (204), an urn (172) having an inner collar wall (232) to carry a pole (204) and a sundial (251). Each of these detachable column fixtures are configured such that their respective bottoms are received on the column shoulder (76) and the support wall (78) of the center column (24). Detachable brushes (86, 124) may be carried on the center column (24) or the birdbath (26).

15 Claims, 8 Drawing Sheets

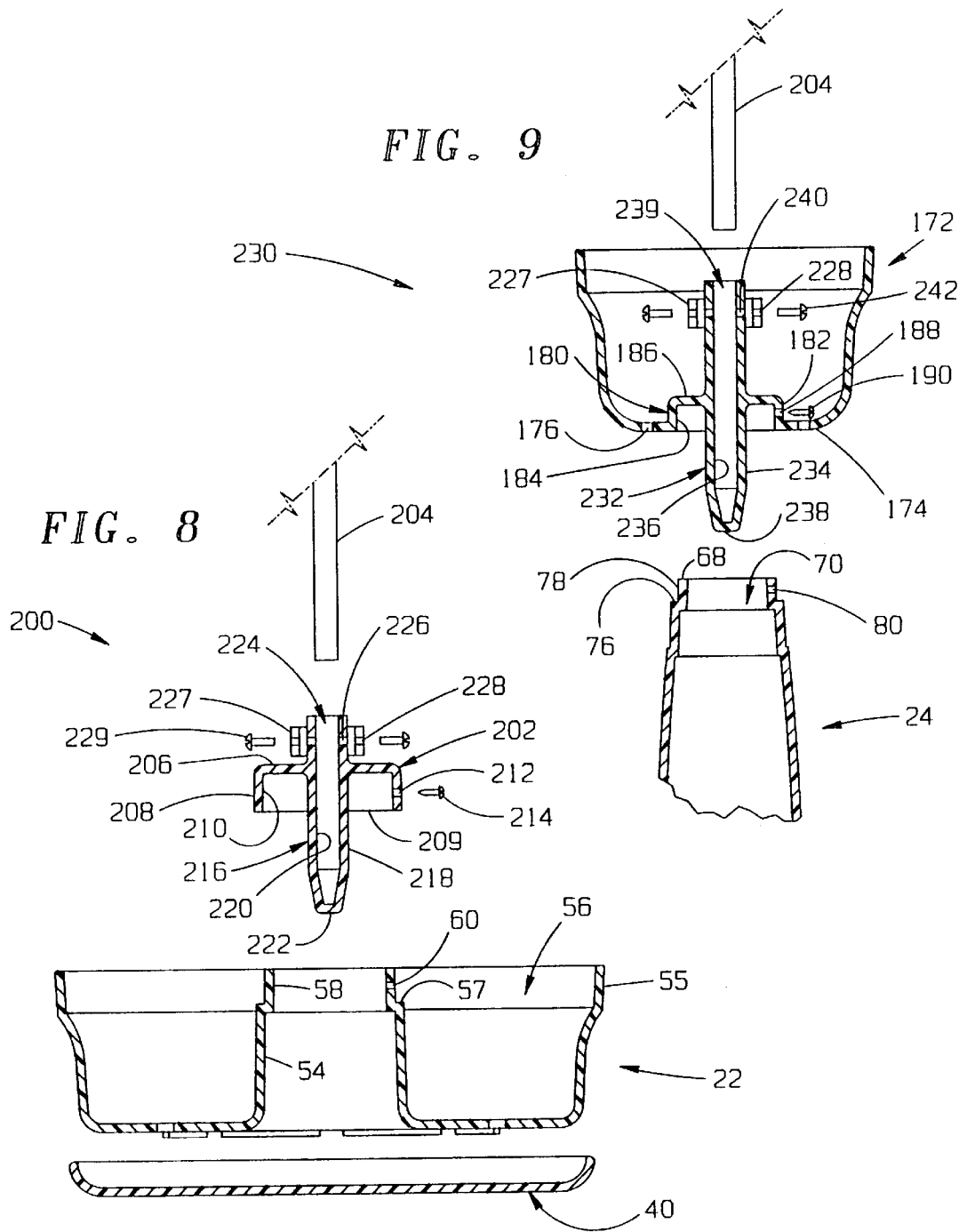

5,966,868

FLOWERPOT AND ASSOCIATED ATTACHMENTS

TECHNICAL FIELD

The present invention generally relates to outdoor lawn fixtures or lawn ornaments, such as flowerpots, birdbaths and the like. More particularly, the present invention relates to flowerpots which are adaptable to receive a plurality of detachable fixtures. Specifically, the present invention relates to flowerpots which are adaptable to carry birdbaths, urns, fountains, poles, sundials and the like.

BACKGROUND OF THE INVENTION

Homeowners, gardeners and others place flowerpots in their gardens and lawns, or on their porches to enhance the aesthetic appearance of the surrounding area with flowers and other plants. It is also known to ornament gardens and other areas with birdbaths, figurines and the like.

Varieties of prior art lawn ornaments are shown in U.S. Pat. Nos. 3,084,666 and 2,002,378, which disclose birdbaths with plant receptacles located within the bowl of the birdbath. Although the birdbaths disclosed in these patents are aesthetically pleasing, they are top-heavy and are prone to tipping over when a strong horizontal force is applied to the birdbath rim. Birdbaths made from relatively light polymeric materials are very susceptible to this problem. One solution to this tipping problem is to manufacture the birdbaths with dense materials such as concrete or stone, or by adding weight to the bottom of the birdbath support column. Unfortunately, this additional weight adds expense and makes the birdbaths difficult to relocate.

Another disadvantage of known lawn ornaments is that they are not easily adapted for combination with other lawn ornaments. For example, although the aforementioned prior art provides plant receptacles within the bowl of a birdbath, none are known to provide a birdbath extending from the interior of a flowerpot. Nor is it known to provide a flowerpot that can receive other upwardly extending lawn fixtures therein. Still another disadvantage of known lawn fixtures is that they do not provide attachments for hiding a brush or other utensil that can be used to clean the fixture.

Based upon the foregoing, there exists a need for a flowerpot that is adaptable to carry other fixtures such as birdbaths, urns, fountains, flag poles and the like. A need also exists for a flowerpot that functions as an anchor for the fixtures carried thereby. There is also a need to provide a fixture which can carry items in a concealed fashion.

DISCLOSURE OF THE INVENTION

It is therefore an object of the present invention to provide a flowerpot which is combinable with a wide variety of attachments.

It is another object of the present invention to provide a flowerpot, as above, which has a column that can support a birdbath.

It is yet another object of the present invention to provide a flowerpot, as above, wherein either the column or the birdbath may detachably carry a concealed item.

It is still another object of the present invention to provide a flowerpot, as above, which may include a fountain supported by the column.

It is a further object of the present invention to provide a flowerpot, as above, which may include an urn supported by the column.

It is an additional object of the present invention to provide a flowerpot, as above, in which an urn supported by the column may receive a pole that carries another item such as a banner, a bird feeder, a flag or the like.

It is a still further object of the present invention to provide a flowerpot, as above, which may include a sundial supported by the column.

It is a further object of the present invention to provide a flowerpot, as above, which may include an attachment collar that receives a pole that carries another item such as a banner, a bird feeder, a flag or the like.

In general, the present invention provides a flowerpot which is readily adaptable to carry a variety of fixtures or attachments. The flowerpot includes a bottom surface which has an outer periphery. An outer wall extends upwardly from the outer periphery and an inner wall extends upwardly from the bottom surface. The bottom surface, the outer wall and the inner wall form a channel to receive plants, flowers and the like. A shoulder extends from the inner wall and is adapted to carry an attachment above the outer wall.

The present invention also provides a combined flowerpot and birdbath which has a bottom surface having an outer periphery. The combined flowerpot and birdbath further includes an outer wall extending from the outer periphery and a column extending upwardly from the bottom surface, wherein the column has a top end extending above the outer wall. The column and the outer wall define a channel therebetween for receiving plants, flowers and the like. A birdbath is supported by the top end of the column.

The present invention further provides a combined flowerpot and urn which has a bottom surface that has an outer periphery. The combined flowerpot and urn also includes an outer wall extending from the outer periphery and a column extending upwardly from the bottom surface. The column has a top end extending above the outer wall. The column and the outer wall define a channel therebetween for receiving plants, flowers and the like. An urn is supported by the top end of the column.

The present invention also provides a combined flowerpot and sundial which has a bottom surface that has an outer periphery. An outer wall extends from the outer periphery and a column extends upwardly from the bottom surface. The column has a top end extending above the outer wall. The column and the outer wall define a channel therebetween for receiving plants, flowers and the like. A sundial is supported by the top end of the column and has appropriate indicia thereon.

A number of alternative embodiments of a flowerpot incorporating the concepts of the present invention are shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 8 is a partial exploded sectional view of an attachment collar which receives a pole, wherein the attachment collar is carried by the flowerpot.

FIG. 9 is a partial exploded sectional view of an urn which has an inner collar wall that receives a pole, wherein the urn is carried by the flowerpot.

PREFERRED EMBODIMENTS FOR CARRYING OUT THE INVENTION

Figure 1:
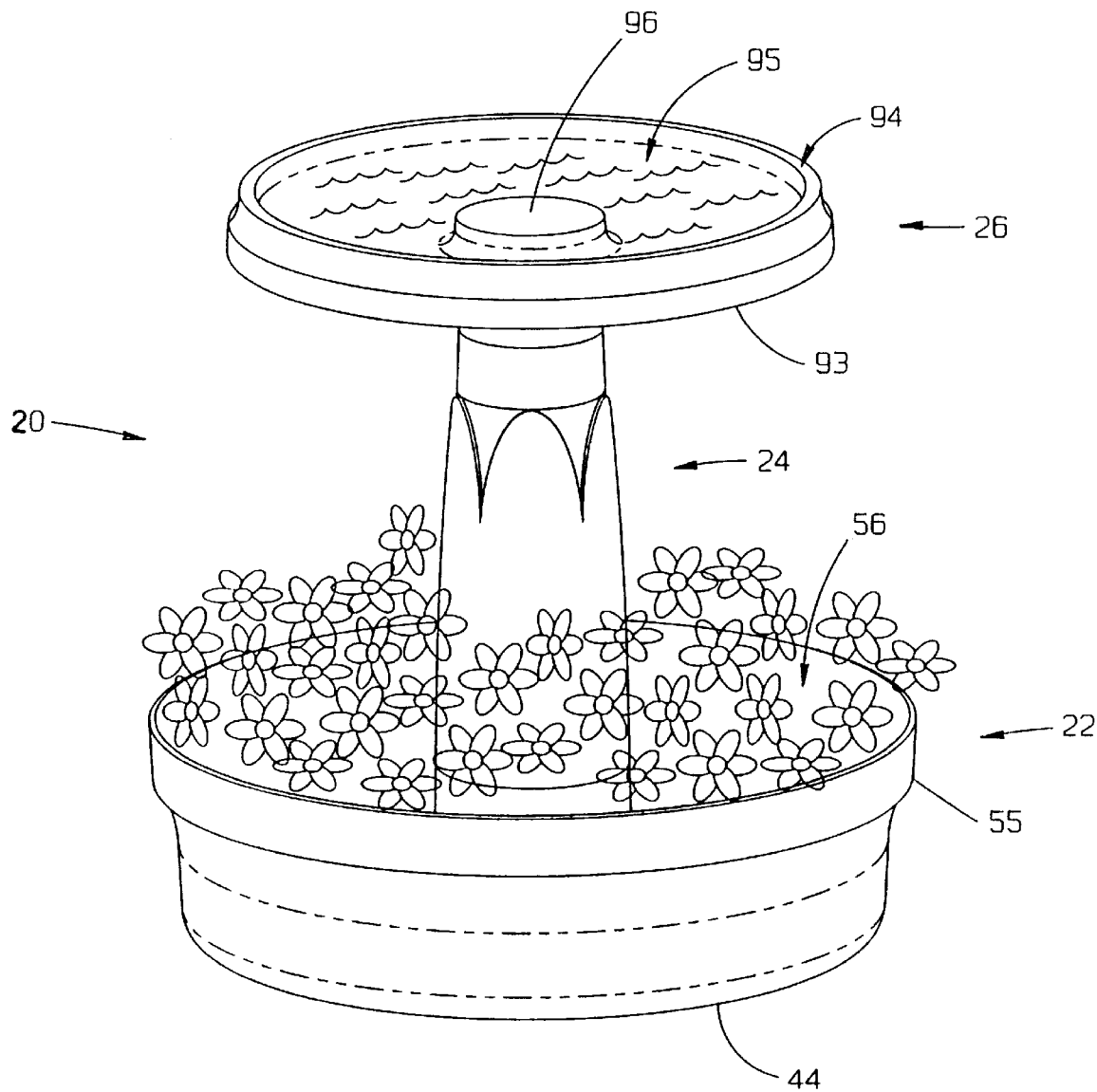
FIG. 1 is a perspective view of a combined flowerpot and birdbath.

Referring now to the drawings and in particular to FIG. 1, a combination flowerpot and birdbath is generally indicated by the numeral 20. Generally, the combination 20 includes a flowerpot 22, a center column 24 received within the interior of the flowerpot 22 and a birdbath 26. The center column 24 may be positioned anywhere within the interior of the flowerpot 22. Moreover, the center column 24 may incorporate a plurality of columns that singly or collectively support a detachable fixture. It will be appreciated that the flowerpot 22 receives dirt, rocks and any other material to support the healthy growth of flowers, plants and the like. The material received in the flowerpot 22 also functions as an anchor to restrict movement thereof and any attached fixture.

Figure 2:
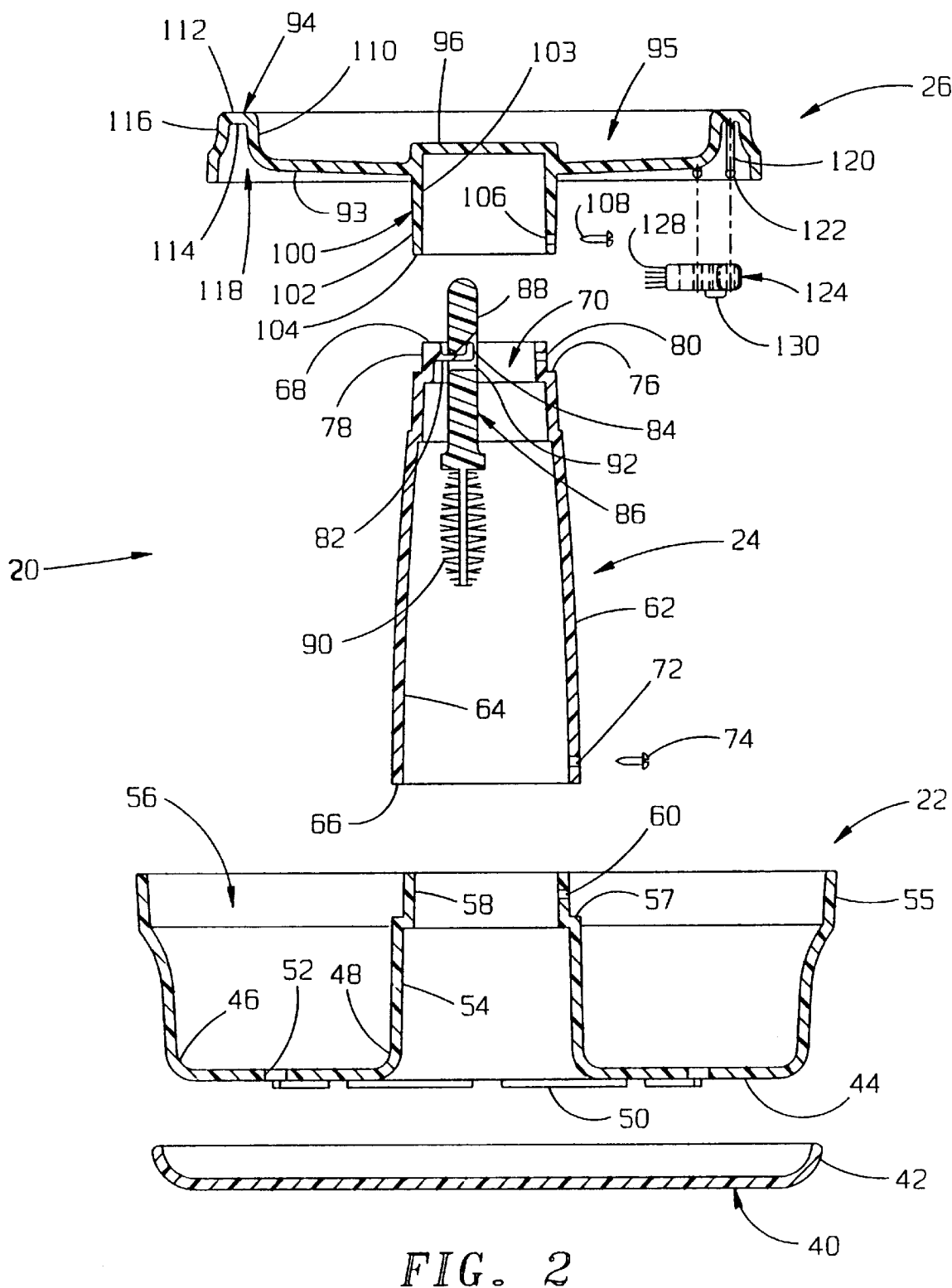
FIG. 2 is an exploded sectional view of the combined flowerpot and birdbath of FIG. 1.

As best seen in FIG. 2, a drainage plate 40 receives the flowerpot 22. A ledge 42 extends upwardly from the drainage plate 40 to hold any excess water that drains from the flowerpot 22. The drainage plate 40 also functions to protect the underside of the flowerpot 22.

The flowerpot 22 includes a bottom surface 44 which is supported by the drainage plate 40 or the ground. The bottom surface 44 has an outer periphery 46 and an inner periphery 48. Although the preferred embodiments of the present invention provide that the flowerpot 22 is generally cylindrical, it will be appreciated any geometric form may be used. A plurality of support feet 50 may extend from the bottom surface 44 to hold the flowerpot 22 a predetermined distance above the drainage plate 40. The bottom surface 44 also includes a plurality of weep holes 52 which drain any excess water from the flowerpot 22 into the drainage plate 40 by virtue of the clearance therebetween provided by the support feet 50.

An inner wall 54 extends upwardly from the bottom surface 44 and in particular the inner periphery 48 thereof. An outer wall 55 extends upwardly from the outer periphery 46. The inner wall 54, the bottom surface 44 and the outer wall 55 define a channel 56 which may receive plants and flowers. Integrally extending inwardly from the inner wall 54 is a shoulder 57 from which extends a support wall 58. Although in the flowerpot 22 shown the inner wall 54 is an annular shape, it will be appreciated that any desired shape may be employed. The support wall 58 includes a bore 60 therethrough.

The center column 24, which is a tubular construction, has an exterior surface 62 opposite an interior surface 64. The center column 24 also includes a bottom end 66 opposed by a top end 68. The interior surface 64 at the bottom end 66 is large enough and of a corresponding shape to extend over the outer periphery of the support wall 58. Accordingly, the bottom end 66 rests upon the shoulder 57. The center column 24 is secured to the flowerpot 22 by a friction fit between the interior surface 64 and the exterior of the support wall 58. The top end 68 has an opening 70 which extends all the way to the bottom end 66. The bottom end 66 may also include a bore 72 which can be aligned with the bore 60 of the support wall 58. A fastener 74 may then be inserted through the bores 60 and 72 to further secure the center column 24 to the flowerpot 22. Of course, other means for securing the center column 24 to the flowerpot 22 may be employed. It should be apparent from the above description that the center column 24 functions as one of a variety of attachments to the flowerpot 22. Moreover, the center column 24 is capable of receiving a variety of detachable column fixtures, such as birdbaths, fountains, urns, flag poles and the like.

Figures 3, 4:
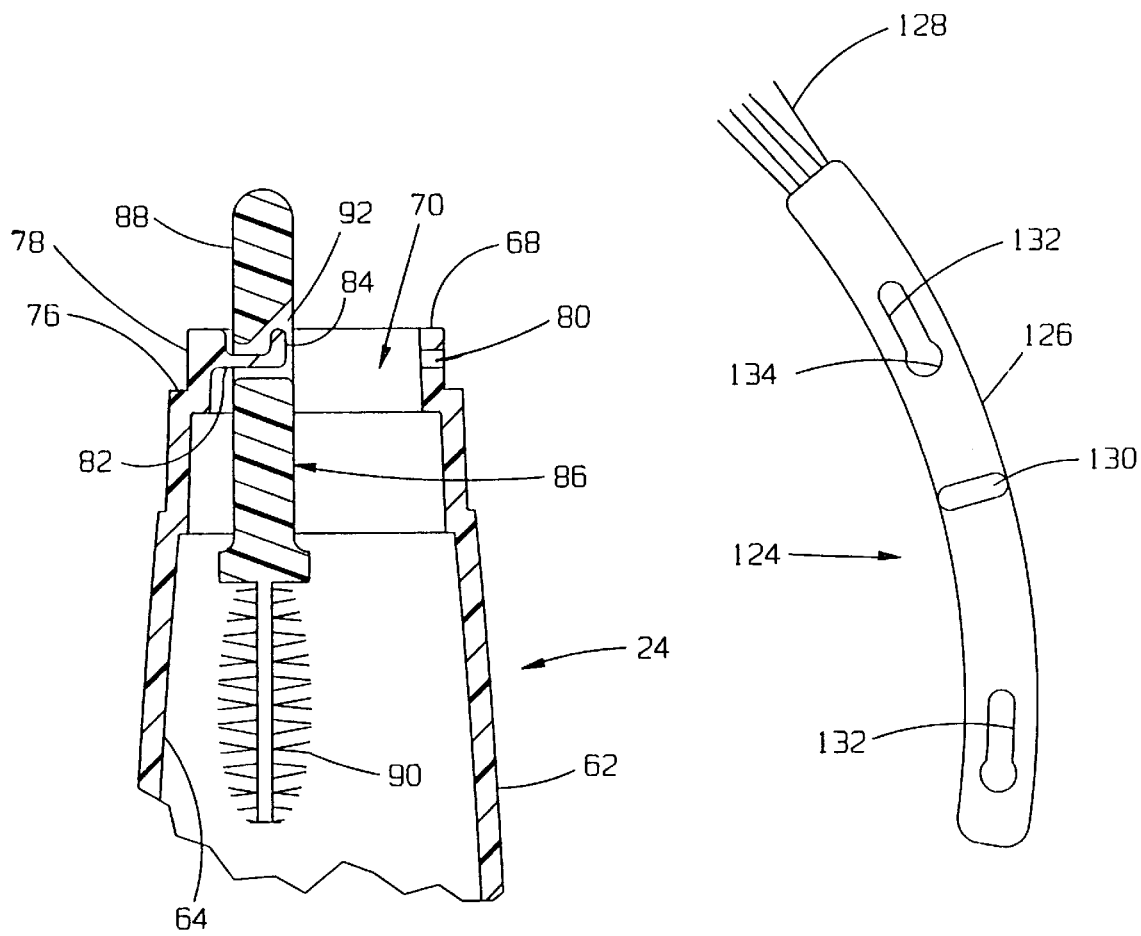
FIG. 3 is an enlarged exploded sectional view of a brush received within a column of the combined flowerpot and birdbath.
FIG. 4 is a bottom view of an alternative brush which is detachably mounted under the birdbath.

As best seen in FIGS. 2 and 3, a column shoulder 76 integrally extends inwardly from the center column 24 and a support wall 78 extends from the column shoulder 76. The support wall 78 may have a bore 80 extending therethrough. A finger 82 extends into the opening 70 from the support wall 78. A hook 84 extends upwardly from the finger 82, wherein the finger 82 and the hook 84 combine to hold items such as a brush 86. The brush 86 includes a handle 88 with a plurality of bristles 90 extending therefrom. The handle 88 has a hole 92 which is carried by the finger 82 when the brush 86 is received within the opening 70. The brush 86 is hidden from view when the birdbath 26 or any similarly constructed detachable column fixture is supported by the center column 24. With the detachable column fixture removed, the handle 88 extends above the top end 68 for easy removal of the brush 86 from the opening 70. The brush 86 may then be used to clean any fixture attached to the flowerpot 22. Of course, other types of cleaning tools may be carried by the finger 82 and the hook 84.

The birdbath 26 includes a base 93 which has an upwardly extending rim 94 that defines a bath area 95. A pedestal 96 extends up from the center portion of the base 93 into the bath area 95 and provides birds an additional place to sit. The pedestal 96 is usually no higher than the top surface of the rim 94.

The birdbath 26, which is received upon the column shoulder 76 and the support wall 78, further includes a collar 100 which extends downwardly from the base 93. The collar 100 has an exterior surface 102 opposite an interior surface 103 which is slightly larger than the outer periphery of the support wall 78. A bottom edge 104 extends from the exterior surface 102 to the interior surface 103. The collar 100 also includes a bore 106 which extends therethrough and which is aligned with the bore 80 for receiving a fastener 108. The bottom edge 104 may rest upon the column shoulder 76 wherein the birdbath 26 is secured to the center column 24 by a friction fit between the interior surface 103 and the exterior of the support wall 78. In addition to the friction fit, the birdbath 26 may be further secured to the center column 24 by the fastener 108. Of course, other means for securing the birdbath 26 to the center column 24 may be employed.

The rim 94 may include an inner rim wall 110 which extends upwardly from the base 93 and is integral with a rim ledge 112 that has an underside 114. An outer rim wall 116 extends downwardly from the rim ledge 112. The inner rim wall 110, the underside 114 and the outer rim wall 116 define a brush channel 118. A plurality of pins 120 extend downwardly from the underside 114. The pins 120 have a head 122 at the end thereof, wherein the diameter of the head 122 is larger than the diameter of the pin 120. The plurality of pins 120 can receive an item such as a brush 124, shown in FIGS. 2 and 4, which is shaped to fit in the brush channel 118. The brush 124 includes a handle 126 from which extends a plurality of bristles 128. The handle 126 may include a grip rib 130 which is employed to move the brush 124 from a latched to an unlatched position on the pins 120. The handle 126 also includes a plurality of slots 132, the number of which is equal to the number of downwardly extending pins 120. The width of the slot 132 is larger than the diameter of the pins 120 but less than the diameter of the heads 122. One end of each slot 132 is provided with a notch 134 which has a diameter slightly larger than the head 122. The brush 124 is moved from an unlatched position to a latched position by pushing the notches 134 over a corresponding head 122. The handle 126 and the slots 132 are then moved so that the handle is supported by the heads 122. This conceals the brush 124 from view while not in use. Of course, other means may be employed to secure the brush 124 to the birdbath 26.

As should be apparent from the description presented above, the combined birdbath and flowerpot 20, which may employ the flowerpot 22, presents numerous advantages. One primary advantage of the combined flowerpot and birdbath 20 is that dirt and other plant material received within the channel 56 functions to anchor the center column 24 or any other attachment received on the flowerpot 22 to stabilize the same. As such, any minimal lateral force applied to the combination 20 does not tip the center column 24 or the birdbath 26 over. A further advantage of the present invention is that any water that drips from the bath area 95 falls onto the flowers or plants in the channel 56. It will further be appreciated that this configuration places the bath area 95 away from the plants. As such, as the plants are watered, dirt is not washed into the birdbath 26 as occurs with prior birdbath-flowerpot configurations. Still another advantage of the present invention is that the individual components of the combined birdbath and flowerpot 20, such as the drainage plate 40, the flowerpot 22, the center column 24 and the birdbath 26 are stackable. Accordingly, a maximum number of each can be shipped and stored in a minimal area. Additionally, the present invention also addresses the manner in which brushes 86 and 124 detachably mounted to the combined flowerpot and birdbath 20. This allows the bath area of the birdbath to be easily cleaned when desired. It will also be appreciated that the flowerpot 22 and the other components of the combined flowerpot and birdbath 20 are conducive for manufacturing with polymeric materials. Accordingly, these configurations are lighter than other known concrete or stone fixtures for easy relocation thereof when the channel 56 is empty.

Figure 5:
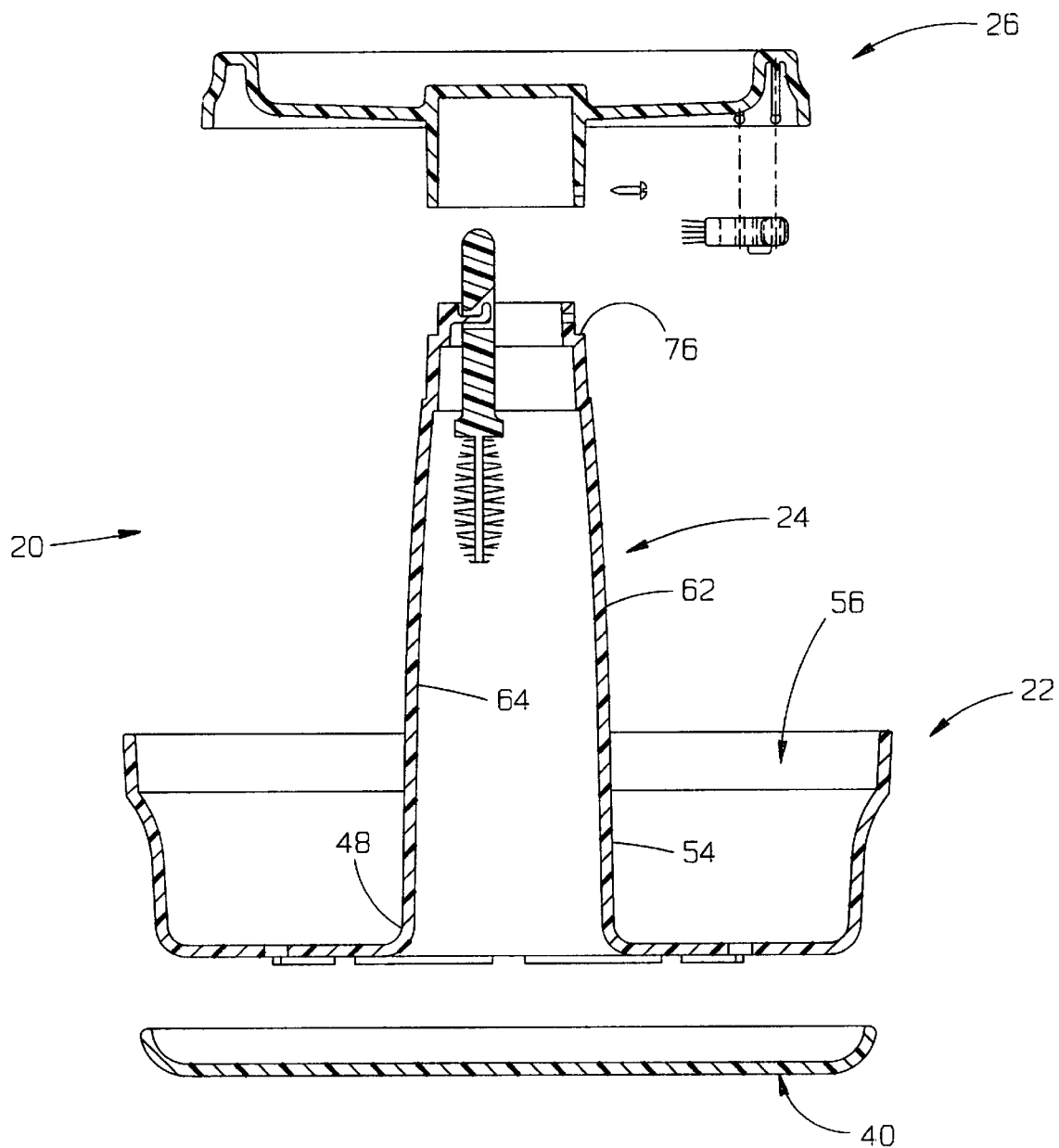
FIG. 5 is an exploded sectional view of a combined flowerpot and birdbath wherein a column integrally extends from the flowerpot.

It will also be appreciated that the combined birdbath and flowerpot 20 may be provided with a more integral construction as shown in FIG. 5. In particular, the flowerpot 22 may be provided with an inner wall 54 that is integral with the center column 24. In other words, the inner wall 54 is a continuation of the center column 24 wherein the exterior surface 62 extends from the inner periphery 48 to the column shoulder 76. This embodiment presents many of the same advantages realized in the embodiments presented in FIGS. 1–4. One additional benefit is that there is one less component to stock and maintain in retail stores.

Figure 6:
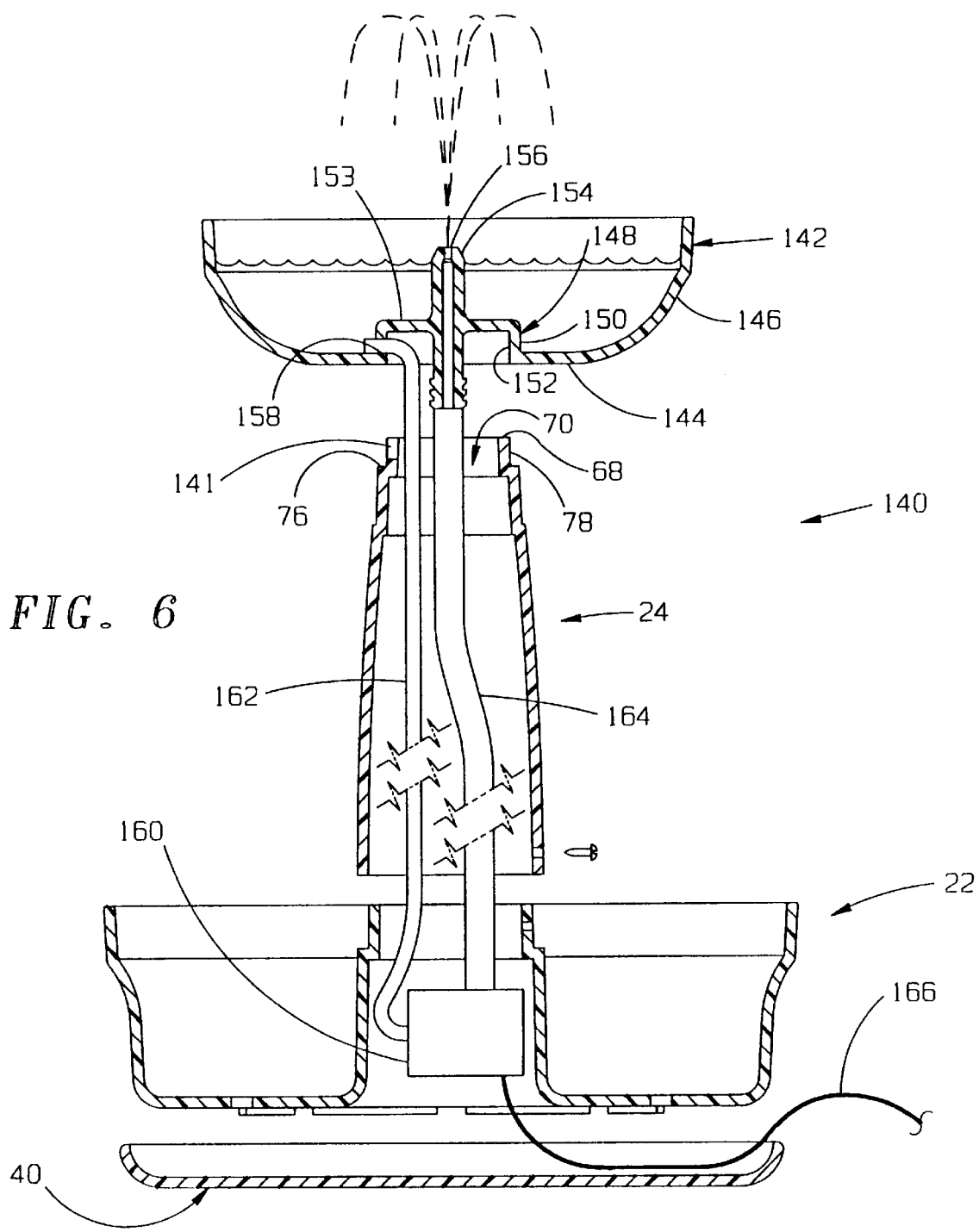
FIG. 6 is an exploded sectional view showing the manner in which a fountain can be carried by the flowerpot.

Referring now to FIG. 6, a combination flowerpot-birdbath-fountain is generally indicated by the numeral 140. Those skilled in the art will appreciate that the combination 140 is essentially the same as the combination 20 except that the center column 24 carries a fountain instead of a birdbath. It will be appreciated that the bowl of the fountain may be used as a birdbath. Since many of the structural elements are the same, they are identified by the same numerals presented in FIGS. 1–5. One additional feature required for this embodiment is that the support wall 78 includes a notch 141.

A bowl 142 is received and carried by the center column 24. The bowl 142 holds a supply of water in much the same manner as the birdbath 26. The bowl 142 includes a bottom 144 from which upwardly extends an outer rim 146. A collar wall 148 extends upwardly from the bottom 144 and has an exterior 150 and an interior 152. The periphery of the interior 152 is large enough to fit around the support wall 78. Accordingly, the bottom 144 rests upon the column shoulder 76. A friction fit is obtained between the interior 152 and the exterior surface of the support wall 78 to secure the bowl 142 to the center column 24. Other means may be employed to further secure the bowl 142 to the center column 24.

A collar platform 153 extends from and encloses the top edge of the collar wall 148. The collar platform 153 is received by and rests upon the top end 68. A nozzle 154, which has an orifice 156, extends through the collar platform 153. The collar wall 148 has a drain port 158 which extends from the exterior 150 to the interior 152.

A recirculating pump 160 is connected to a drain tube 162 and a nozzle tube 164. One end of the drain tube 162 is received within the drain port 158 and the opposite end of the drain tube 162 is connected to the recirculating pump 160. When the bowl 142 is secured to the center column 24, the drain tube 162 is received in the notch 141. The drain tube 162 seals the drain port 158 so that any water contained within the bowl 142 drains into the drain tube 162. One end of the nozzle tube 164 is connected to the nozzle 154 while the opposite end is connected to the recirculating pump 160. A power cord 166 is connected to the circulating pump 160 to provide electrical power thereto. If needed, a fresh supply of water may be connected to the pump 160 to supplement any water that may evaporate.

In use, the combined flowerpot-birdbath-fountain 140 receives a supply of water within the bowl 142 which drains into the drain tube 162 and to the recirculating pump 160. Accordingly, the recirculation pump 160 forces any water received therein up the nozzle tube 164 and out the orifice 156 to present a spray which falls within the bowl 142.

This embodiment provides many of the same advantages discussed above plus the additional advantage of providing a fountain which enhances the aesthetic appearance of the flowerpot 22 and the center column 24. It will be appreciated that the bowl 142 is one of the variety of detachable column fixtures.

Figure 7:
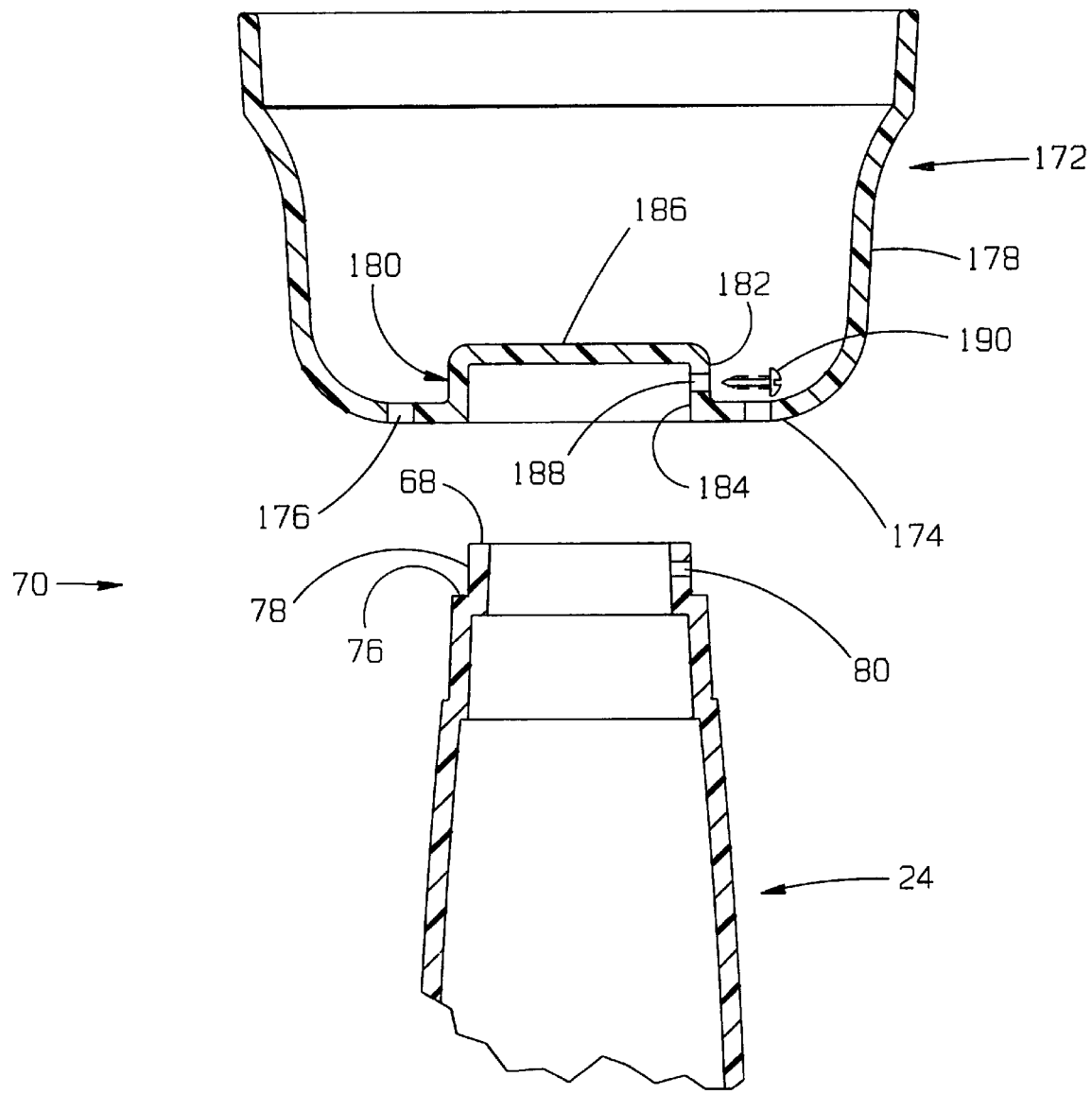
FIG. 7 is a partial exploded sectional view showing the manner in which an urn can be carried by the flowerpot.

Referring now to FIG. 7, a combination flowerpot and urn is generally designated by the numeral 170. In this embodiment, an urn 172, which can receive flowers or other plants, includes a base 174 through which extends a plurality of weep holes 176. An outer wall 178 extends upwardly from the base 174. A collar wall 180 extends upwardly from the base 174 in an area within the outer wall 178. The collar wall 180 has an exterior 182 and an interior 184. A friction fit is obtained between the interior 184 and the exterior surface of the support wall 78 to secure the urn 172 to the center column 24. The collar wall 180 has a collar platform 186 which is supported by the top end 68 and wherein the base 174 is supported by the column shoulder 76. The collar wall 180 also includes a bore 188 that extends from the exterior 182 to the interior 184 and which receives a fastener 190 that is also received by the bore 80 to further secure the urn 172 to the center column 24. Of course, any other means for securing the urn 172 to the center column 24 may be employed.

The embodiment provides many of the same advantages discussed above plus the additional advantage of a second receptacle for displaying flowers. The urn 172 provides a further advantage of allowing excess water to drain through the weep holes 176 and onto the flowers or other plants contained within the flowerpot 22. The urn 172 is another example of a detachable column fixture that can be supported by the center column 24.

Referring now to FIG. 8, a combination flowerpot and flag attachment is generally indicated by the numeral 200. In this embodiment an attachment collar 202 is employed in place of the center column 24 for the purpose of carrying a pole 204 upon which could be mounted a flag, a banner, a bird feeder and the like. The attachment collar 202 includes a platform 206 from which downwardly extends an outer collar wall 208. The outer collar wall 208 has a bottom edge 209 which is supported by the shoulder 57 when the attachment collar 202 is carried by the flowerpot 22. The outer collar wall 208 has an interior surface 210 which has a periphery corresponding to and large enough to fit over the support wall 58. As in other embodiments, a friction fit between the interior surface 210 and the exterior of the support wall 58 secures the attachment collar 202 to the flowerpot 22. Extending through the outer collar wall 208 is a bore 212 which receives a fastener 214 that is also received by the bore 60. In addition to the friction fit, the fastener 214 is one of many other means for securing the attachment collar 202 to the flowerpot 22.

An inner collar wall 216 extends through the platform 206 and receives the pole 204. The inner collar wall 216 has an exterior 218 opposite an interior 220. A bottom 222 extends from and closes the bottom portion of the inner collar wall 216 to define a pole cavity 224. Extending through the inner collar wall 216, above the platform 206, are a plurality of bores 226. A collar 227, which has a plurality of threaded holes 228 therethrough that align with the bores 226, can be disposed around the inner collar wall 216. Fasteners 229 are inserted through the bores 226 and the threaded holes 228 to secure and center the pole 204 in the pole cavity 224. The closed end of the inner collar wall 216 may be tapered inwardly from the interior surface 220 to the bottom 222. The taper functions to further center and seat the pole 204 within the pole cavity 224. The collar 227 and the fasteners 229 may be made of brass or any other corrosion-proof material.

As in the previous embodiments, the flowerpot 22 functions as an anchor when rocks, dirt and plants are received therein. As such, the flowerpot 22 can receive and hold poles which may carry a variety of other lawn ornaments. The attachment collar 202 is another example of a detachable fixture carried by the flowerpot 22.

Referring now to FIG. 9, a combination flowerpot-urn-flag attachment is generally indicated by the numeral 230. This embodiment utilizes many of the same elements of the urn 172 as utilized in FIG. 7 but also includes an inner collar wall 232 which extends through the collar platform 186. The inner collar wall 232 has an exterior 234 and an interior 236. A bottom 238 extends from and closes the bottom portion of the inner collar wall 232 to define a pole cavity 239. As discussed in the embodiment shown in FIG. 7, the urn 172 shown in FIG. 9 may be secured to the center column 24 by a friction fit, by fasteners or by other similar means. Likewise, the inner collar wall 232 and the collar 227 function in this embodiment as in the previous embodiment to further secure the pole 204 in the pole cavity 239. Extending through the inner collar wall 232 are a plurality of bores 240 that are aligned with the threaded holes 228 which receive a like plurality of fasteners 242 for securing the pole 204 within the pole cavity 239. The closed end of the inner collar wall 232 may be tapered inwardly from the interior surface 236 to the bottom 238. The taper functions to center and seat the pole 204 within the pole cavity 239.

In the combination flowerpot-urn-flag attachment 230, the urn 172 with the inner collar wall 232 provides another structure for carrying the pole 204 upon which can be mounted other lawn fixtures. This embodiment provides yet another example of the variety of detachable column fixtures which may be received by the center column 24.

Figure 10:
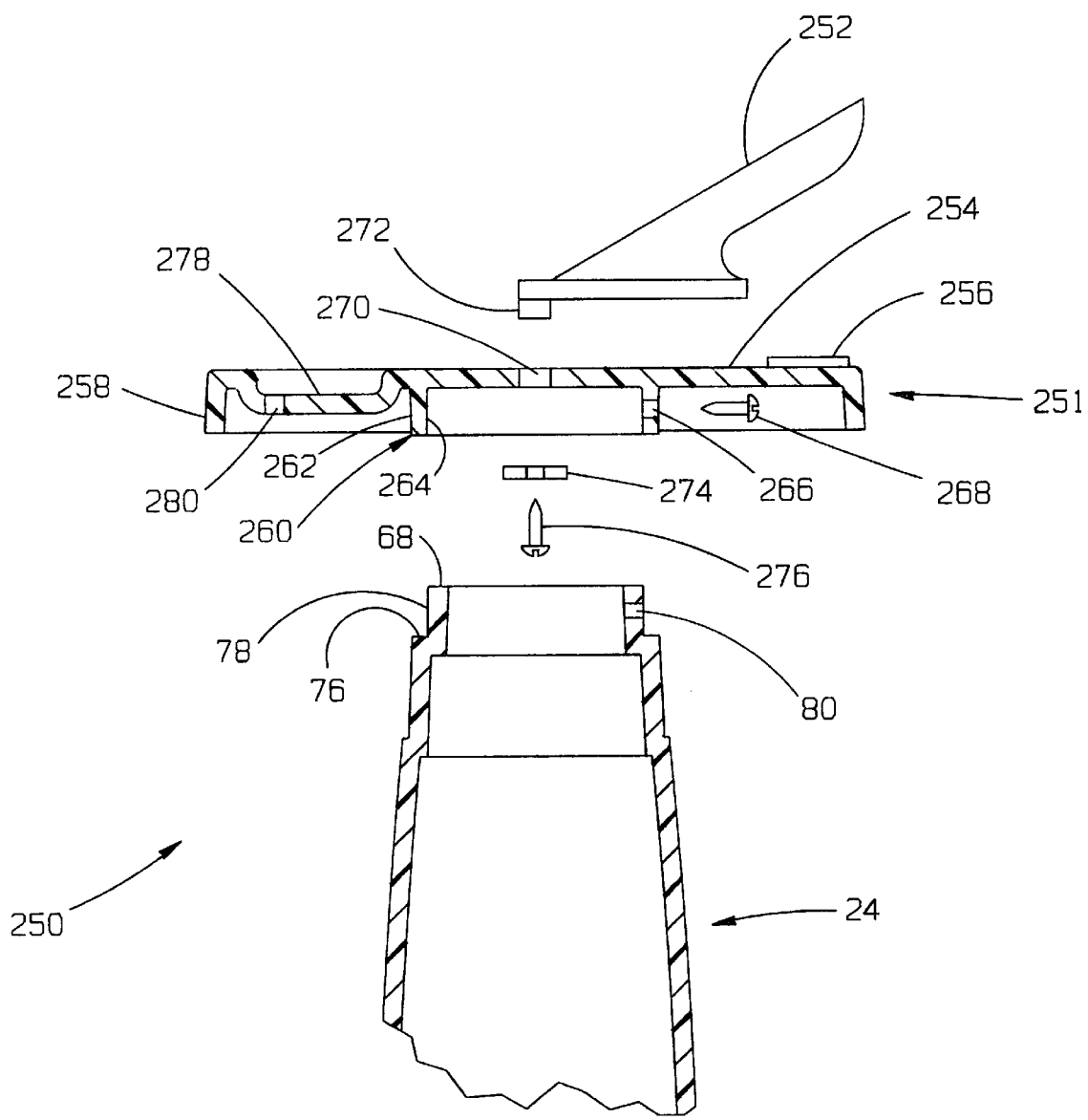
FIG. 10 is a partial exploded sectional view showing the manner in which a sundial can be carried by the flowerpot.

Referring now to FIG. 10, a combination flowerpot and sundial is generally indicated by the numeral 250. As in the previous embodiments, the center column 24 functions to support a lawn ornament, in this instance a sundial 251. The sundial 251 includes a gnomon 252 supported by a plate 254 which has received thereon a plurality of marking indicia 256 which indicates various hours of the day. An outer wall 258 extends downwardly from the outer periphery of the plate 254 while an inner wall 260 extends downwardly from the bottom surface of the plate 254. The inner wall 260 has an exterior 262 and an interior 264. The inner wall 260 is received upon and supported by the column shoulder 76 wherein the support wall 78 is received within the interior 264. A friction fit is obtained between the interior 264 and the exterior of the support wall 78. Extending through the inner wall 260 is a bore 266 that is aligned with the bore 80 to receive a fastener 268 that may be used in addition to the friction fit to secure the plate 254 to the center column 24.

The plate 254 has an aperture 270 extending therethrough. The gnomon 252 includes a boss 272 which extends downwardly therefrom and which fits within the aperture 270. A washer 274 is received in a bearing relationship with the boss 272 and the underside of the plate 254. A fastener 276 is received in the boss 272 to interconnect the gnomon 251 to the plate 254. The plate 254 may also include a feeding tray 278 which has a drain hole 280 therethrough. Bird feed may be placed in the feeding tray to attract birds to the sundial 252.

The sundial 251 presents yet another example of a detachable column fixture that is received by the center column 24. Those skilled in the art will appreciate that the sundial 251 presented is an armillary sundial. It is within the scope of the present invention that other types of sundials may be employed. This embodiment provides another aesthetically pleasing lawn ornament which can be secured to the flowerpot 22.

Based upon the foregoing disclosure, it should now be apparent that the use of the flowerpot described herein will carry out the objects set forth hereinabove. It is, therefore, to be understood that any variations evident fall within the scope of the claimed invention and thus, the selection of dimensions, materials of construction and the like can be determined without departing from the spirit of the invention herein disclosed and described. Thus, the scope of the invention shown includes all modifications and variations that may fall within the scope of the attached claims.

What is claimed is:

1. A flowerpot including an attachment, comprising:

a bottom surface having an outer periphery;

an outer wall extending upwardly from said outer periphery;

an inner wall extending upwardly from said bottom surface, said bottom surface, said outer wall and said inner wall forming a channel;

a shoulder extending inwardly from said inner wall from which upwardly extends a support wall, and an attachment having an exterior surface opposite an interior surface and connected by a bottom end, said bottom end resting upon said shoulder, said interior surface frictionally fitting about said support wall and said exterior surface positioned to be substantially flush with said inner wall, said attachment extending above said outer wall.

2. The flowerpot according to claim 1, wherein said attachment includes at least one column having a top end opposite said bottom end, said top end having a column shoulder inwardly extending from said exterior surface, said column shoulder having a column support wall for receiving a detachable fixture which rests upon said column shoulder and frictionally fits to said column support wall.

3. The flowerpot according to claim 2, wherein said fixture includes a birdbath having a base from which extends a rim that defines a bath area, said base having a downwardly extending birdbath collar which is carried by said column shoulder, said channel receiving dirt for flowers and said bath area receiving water, wherein any water that is forced over said rim falls into said channel.

4. The flowerpot according to claim 3, further comprising:

a brush having a handle with a slot therethrough, one end of said slot expanding into a notch; and a pin having an enlarged head for carrying said brush extending from said birdbath, said enlarged head fitting through said notch and supporting said handle at said slot.

5. The flowerpot according to claim 2, further comprising:

a brush having a handle with a hole therethrough; and a hook for carrying said brush extending from said interior surface of said column, said hook carrying said handle through said hole so that said handle extends above said top end.

6. The flowerpot according to claim 2, wherein said fixture is a fountain, said fountain including a bowl having a bottom and an outer rim extending upwardly from said bottom, said bowl receiving a supply of water;

a collar wall extending from said bottom, said collar wall carried by said column shoulder, said collar wall having a drain port therethrough;

a collar platform extending from said collar wall;

a nozzle extending through said collar platform and into said bowl;

a recirculating pump having a drain tube connected to said drain port and a nozzle tube connected to said nozzle, said recirculating pump receiving water from said drain port and spraying the water through said nozzle.

7. The flowerpot according to claim 2, wherein said fixture includes an urn, said urn having a base from which extends an outer wall and a collar wall, said collar wall carried by said column shoulder.

8. The flowerpot according to claim 7, further comprising:

a collar platform extending from said collar wall; and an inner collar wall extending from said collar platform, said inner collar wall defining a pole cavity which receives a pole.

9. The flowerpot according to claim 2, wherein said fixture includes a sundial having a plate with indicia thereon, said plate having an inner wall extending therefrom, said inner wall carried by said column shoulder.

10. The flowerpot according to claim 2, wherein said detachable fixture includes an attachment collar having an outer collar wall and an inner collar wall, said outer collar wall carried by said column shoulder, said inner collar wall frictionally engaging said column support wall.

11. A combined flowerpot and birdbath, comprising:

a bottom surface having an outer periphery;

an outer wall extending from said outer periphery;

a column extending upwardly from said bottom surface, said column having a top end extending above said outer wall, said top end having a column shoulder from which upwardly extends a column support wall, said column and said outer wall defining a channel therebetween; and a birdbath supported by said top end of said column said birdbath having a downwardly extending collar that rests upon said column, shoulder, said collar in a substantially parallel relationship with said column support wall to provide stability between said birdbath and said column when mated with one another.

12. The combined flowerpot and birdbath according to claim 11, further comprising a brush detachably mounted to said column, said brush having a handle with a hole therethrough, wherein said top end of said column has an interior surface from which extends a hook, said top end forming an opening for receiving said brush with said hook inserted into said hole, said birdbath covering said opening, and wherein said birdbath is removable to allow access to said brush, wherein said handle extends above said top end.

13. The combined flowerpot and birdbath according to claim 11, further comprising:

a brush having a handle with a slot therethrough, one end of said slot expanding into a notch; and a pin having an enlarged head for carrying said brush extending from said birdbath, said enlarged head fitting through said notch and supporting said handle at said slot.

14. The combined flowerpot and birdbath according to claim 11, wherein said birdbath has a rim aligned over said channel such that any water that flows over said rim falls into said channel.

15. The combined flowerpot and birdbath according to claim 11, wherein said collar frictionally fits over said column support wall.

* * * * *